(12) United States Patent
Haack

(10) Patent No.: US 6,182,360 B1
(45) Date of Patent: Feb. 6, 2001

(54) METHOD OF PRODUCING AND STACKING COMPONENTS

(75) Inventor: Johannes Haack, Studen (CH)

(73) Assignee: Feintool International Holding AG (CH)

( * ) Notice: Under 35 U.S.C. 154(b), the term of this patent shall be extended for 0 days.

(21) Appl. No.: 09/242,581

(22) PCT Filed: Aug. 14, 1997

(86) PCT No.: PCT/EP97/04464

§ 371 Date: Feb. 18, 1999

§ 102(e) Date: Feb. 18, 1999

(87) PCT Pub. No.: WO98/08634

PCT Pub. Date: Mar. 5, 1998

(30) Foreign Application Priority Data

Aug. 28, 1996 (DE) .............................. 196 34 723

(51) Int. Cl.⁷ .................................................... B23P 15/00
(52) U.S. Cl. .................... 29/888.1; 29/525.06; 29/527.7; 72/327
(58) Field of Search .................. 29/888.1, 17.2, 29/17.4, 430, 525.06, 527.6, 527.7; 72/327, 333

(56) References Cited

FOREIGN PATENT DOCUMENTS

| 2750742 | 5/1979 | (DE) . |
| 3841205 | 6/1990 | (DE) . |
| 0 183 648 | 6/1986 | (EP) . |

OTHER PUBLICATIONS

F. Strasser, "Gewindebohren in sehr Kleinen Blechausschnitten" (screw tapping in very small sheet metal cutouts), vol. 93, No. 3, p. 155, 1960.

Primary Examiner—I Cuda Rosenbaum
(74) Attorney, Agent, or Firm—Bachman & LaPointe, P.C.

(57) ABSTRACT

A method of producing and stacking components from individual layers which are punched, cut or the like out of a hardened material strip. According to the method, layers are removed from a hardened material strip, the removed layers are pressed back into the material strip and pressed out of the latter in a subsequent station (ii). They are then inserted into a stack magazine in which the individual layers are centered and assembled to form a component, the component then being removed from the stack magazine.

9 Claims, 6 Drawing Sheets

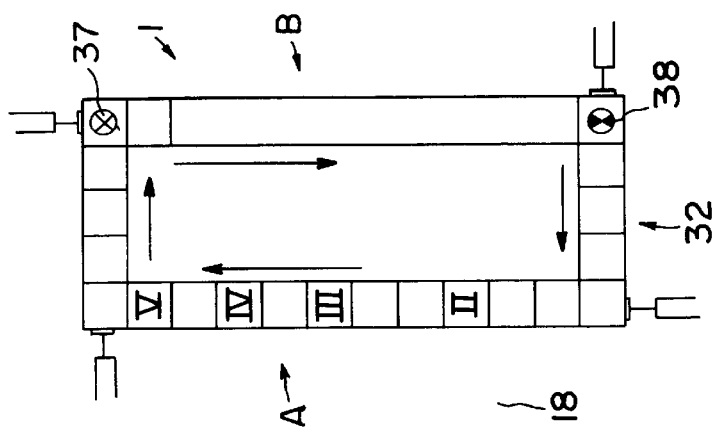
FIG. 2
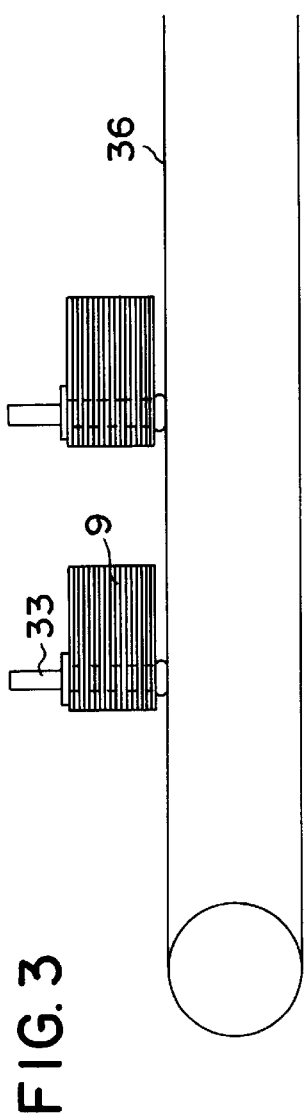
FIG. 3
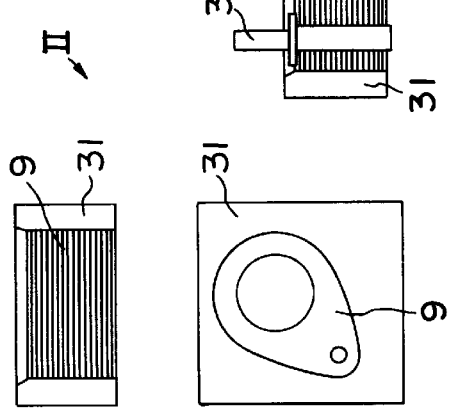

METHOD OF PRODUCING AND STACKING COMPONENTS

BACKGROUND OF THE INVENTION

The invention relates to a method for the production and layering of components consisting of individual layers which are punched out, cut out or the like from a material strip, the layers, after being punched out or the like, being pressed back into the material strip again, and to an apparatus for this purpose.

Components, for example for automobiles, such as connecting rods, cams, gearwheels, toothed rings or the like, are produced either by the casting method or by being punched out or cut out from a relatively thick material strip. A precision cutting device of this type is described, for example, in EP 0,183,648.

With reference to a full cam, a known process chain for producing the latter will be described below. First, a blank is separated from a material strip by the punching press. A solid lubricant is applied to this blank. Heating of the blank, preforming and annealing are subsequently carried out.

A solid lubricant is then applied once again, and the semifinished product is preformed and finally ready-formed. Calibration and inductive hardening then take place, after which reaming and chamfering are carried out to obtain the finished cam. The cam is then joined onto a tube, so that a camshaft is produced. The latter is ground. A method of this kind is highly complicated.

Furthermore, DE-A-38 41 205 describes the production of workpieces from metal. Reference is made primarily to the production of a connecting rod, in terms of construction the connecting rod being broken down into individual simple part profiles, and these being produced by precision cutting and, by being layered, being assembled together to form the finished part and connected to one another. This therefore relates to the production of a part of complicated design from different part profiles having different contours.

It is known, for example, from DE 27 50 742, to separate sheet metal parts from a sheet metal band material by means of shears and subsequently to layer them one on top of the other in a stacking device.

Strasser F. "Gewindebohren in sehr kleinen Blechausschnitten in: Werkstatt und Betrieb", ["Screw tapping in very small sheet metal cutouts in: Workshop and Factory"], volume 93, 1960, number 3, page 155, describes perforating and cutting out workpieces in follow-up cuts, said workpieces, after being cut out, not falling downward through the die plate opening, but, instead, being pressed back into the sheet metal strip again by a spring-actuated striking ram.

SUMMARY OF THE INVENTION

By contrast, the object of the present invention is to produce simple components consisting of a plurality of identical layers in a simple and cost-effective way and to position said components exactly in relation to one another.

To achieve this object, the layers are pressed out of the material strip in a subsequent station and are inserted into a stack magazine, in which the individual layers are centered and connected to form the component, before the latter is discharged from the stack magazine.

This means that components of relatively great thickness can be produced from individual thin hardened lamellae by the latter being layered. Preferably, these layers are connected to one another by riveting in a further machining method.

The individual lamellae have the shape of the part, and the number of individual lamellae gives the cam height. Since the lamellae are very thin (for example, 0.1–2 millimeters), they can be punched out of already hardened material, so that there is no longer any need for subsequent hardening or grinding. The layered component is a finished part. The material may already have a hardness of up to and above 63 HRC.

Furthermore, it is possible, by punching the thin lamellae, to produce cams having very small cross sections between the inner and the outer contour. The cams may also have very small holes of, for example, 1 millimeter. These holes serve for weight reduction or mass equalization or may be used as a receptacle for a rivet.

Moreover, it is possible, by punching the thin lamellae, to adhere to tolerance qualities of class 6 for inner and outer shapes. Above all, the production costs are also reduced, since the method sequence according to the invention requires only few work steps.

There is scarcely any need for additional investment. The layered cam has already met stringent requirements in the engine and is distinguished by a high degree of damping, low noise generation and the least possible wear, since, as a result of the lamellae, a capillary action occurs and lubricating oil is constantly carried onto the operating surfaces.

The core of the apparatus for carrying out the method is a punching press, in the die of which the inner and the outer shape of the layer are cut simultaneously during the overall cut. A follow-up die would also be possible, but the tolerances between the inner and the outer shape become too great.

The cut part is pressed back into the punching screen.

The inner shape waste falls through the cutting punch and corresponding shafts in the machine table of the punching press and is discharged downward.

The punching die is followed by an assembly station, in which the individual layers are collected in a stack magazine. At the same time, a bundling ram presses the individual lamellae (layers) out of the punching screen in synchronism with the plunger stroke of the punching press.

According to the invention, the entire process takes place either in a timed feed unit or on a rotary indexing plate.

After a specific number of punching strokes, which corresponds to the number of layers for producing a component (cam), the rotary indexing plate switches one position further or the stack magazine is transported to the next station in the timed feed unit. An empty stack magazine at the same time extends beneath the bundling ram.

In the following station, at least one rivet is supplied to the stack magazine, in the next station the layers are centered and riveted, and in the next station the finished component is pressed out of the stack magazine, for example by a ram, passes onto a band or the like and is transported for final assembly.

The material strip preferably comes from a coil winder, with its own drive, into the punching press, a corresponding band loop control being provided here. The punching machine itself is an automatic precision puncher with entry feed, band lubrication, etc. Depending on the number of components required, the method according to the invention is possible with a single-drop die, but also with multiple-drop dies, thus resulting in additional cost effectiveness.

DESCRIPTION OF THE DRAWINGS

Further advantages, features and details of the invention can be gathered from the following description of preferred exemplary embodiments and with reference to the drawing in which:

FIG. 2 shows a top view of a diagrammatically illustrated timed feed unit in the apparatus according to FIG. 1;

FIG. 3 shows a diagrammatically illustrated method sequence for layered components;

DESCRIPTION OF THE PREFERRED EMBODIMENTS

Figure 1:
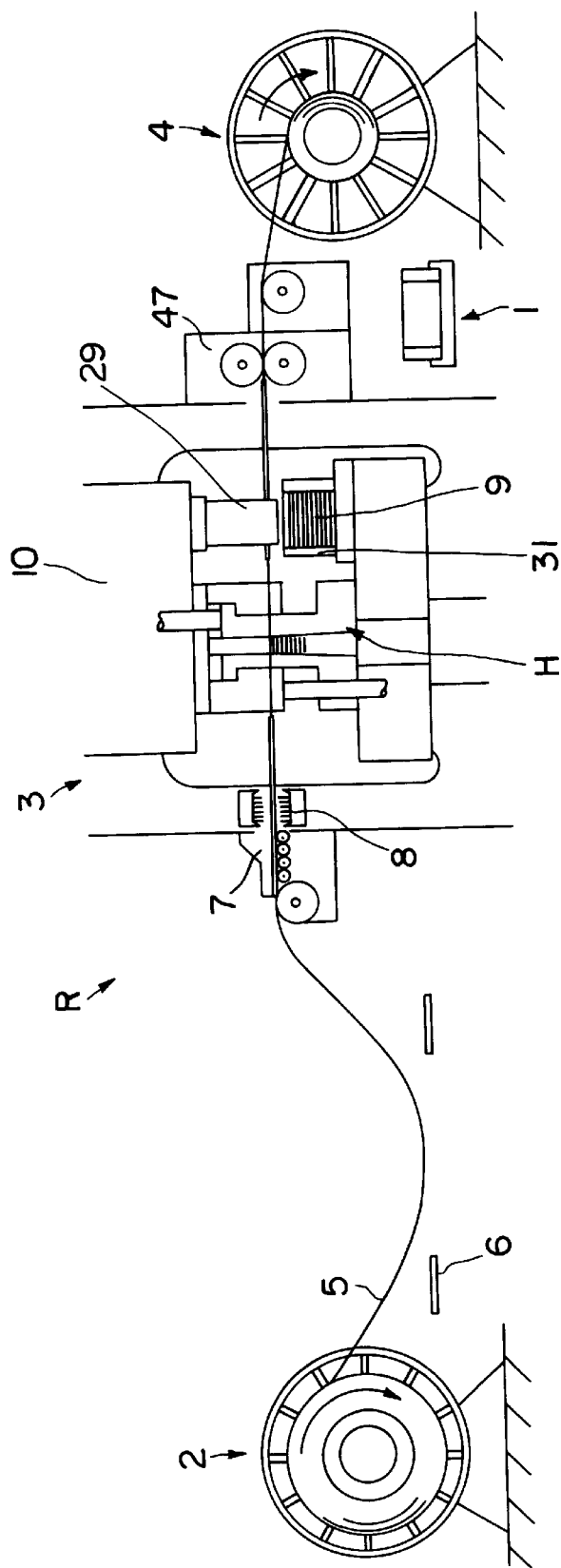
FIG. 1 shows a diagrammatic illustration of an apparatus according to the invention for the production and layering of components.

According to FIG. 1, an apparatus R for the production and layering of components has a coil winder 2, a punching press 3, an only partially indicated timed feed unit 1 and a waste winder 4.

A material strip 5 is unrolled clockwise from a coil winder 2 which is provided with its own drive. This material strip 5 passes a light barrier 6 which indicates when the material strip 5 sags too low. The material strip 5 thereafter enters a material entry 7 of the punching press 3 and there passes a lubricating appliance 8, via which lubricating oil comes onto the surfaces of the material strip 5.

The material strip 5 runs next through a die H for cutting out or punching the inner and outer shapes of component layers 30, of cam layers in the present exemplary embodiment.

Figure 4:
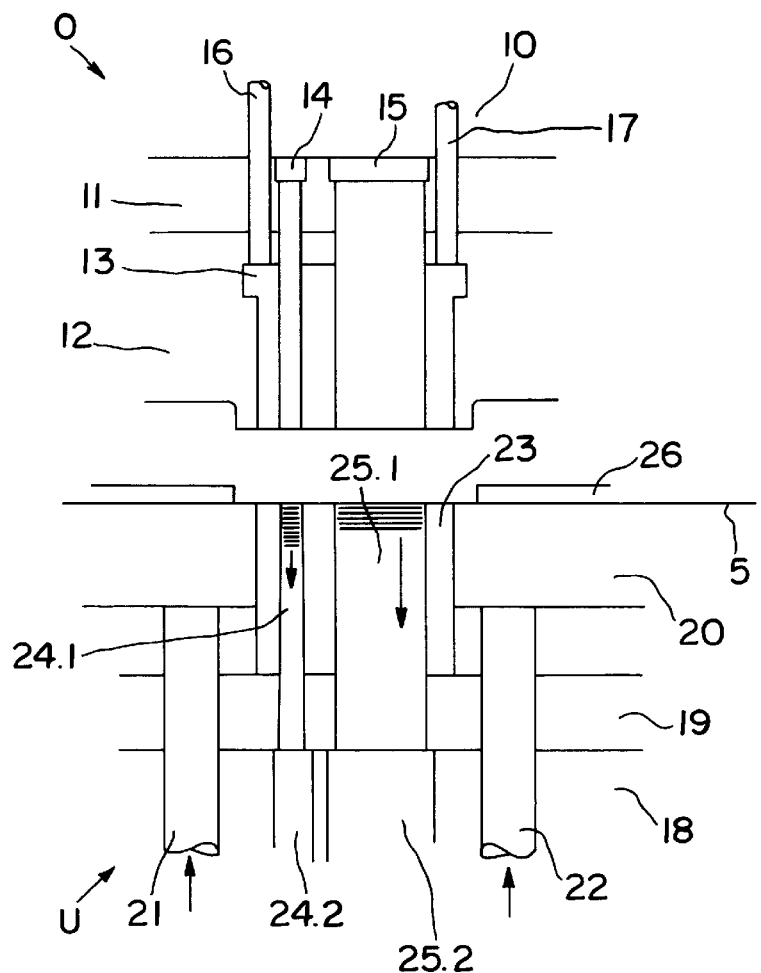
FIG. 4 shows a detail, illustrated on an enlarged scale, from a punching press according to FIG. 1 in the region of the die.

A detail of the die H is illustrated on an enlarged scale in FIG. 4. It consists of a top part O and a bottom part U.

The top part O, which is vertically movable, has a plunger 10 which can be seen more clearly in FIG. 1. This plunger 10 is followed by a chucking plate 11 and, after this, a cutting plate 12, in which, in turn, an ejector 13 and two inner shape rams 14, 15 are guided. These inner shape rams 14, 15 serve for punching inner shapes out of the cam layers 30. The ejector 13 is under the pressure of thrust bolts 16, 17.

The bottom part U of the die H is assigned a machine table 18. A chucking plate 19 rests on the latter. A stripping plate 20 is under the pressure of thrust bolts 21, 22. A cutting ram 23, which has conical shafts 24.1, 25.1, is provided in the chucking plate 19 and the stripping plate 20. The inner shape waste punched out of the cam layer 30 by the inner shape rams 14, 15 travels downward through shafts 24.2, 25.2 in the machine table 18 out of the die H. After punching, the parts are pressed into the punching screen again immediately. For this purpose, the forces act on the ejector 13 and the stripping plate 20. A band guide 26 corresponding to the material thickness serves for ensuring that the punching screen, together with the parts which have been pressed back, is fed to the next machining station.

Figure 5:
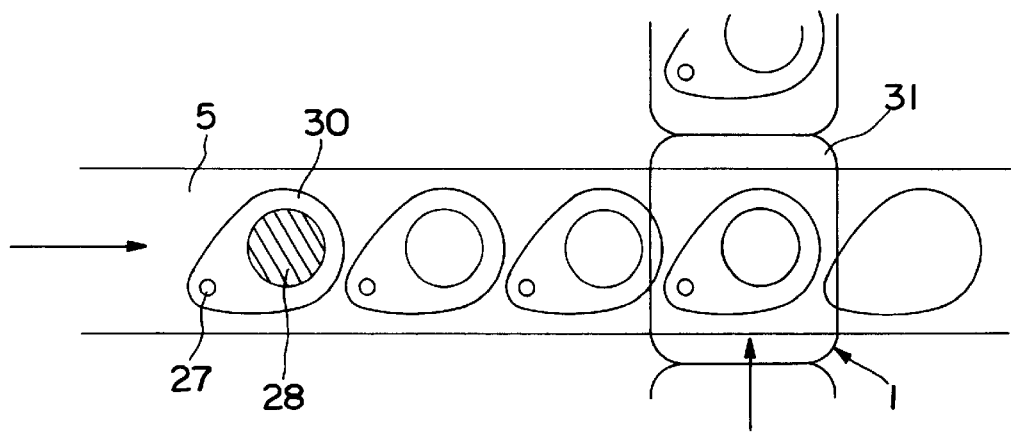
FIG. 5 shows a top view of a material strip for forming the components.

FIG. 5 shows a top view of the material strip 5 for forming the cam layers 30. The parts falling away as inner shape waste 27, 28 are indicated by hatching. Furthermore, the first stage of the timed feed unit 1 can be seen, in which a bundling ram 29, illustrated in FIG. 1, has pressed the punched cam layer 30 into a stack magazine 31. The stack magazine 31 may be preceded by an intermediate magazine, into which the bundling ram 29 presses out individual parts.

A top view of the complete timed feed unit 1 is illustrated in FIG. 2. It has a level A and a level B. The material strip 5 is transported on the machine table 18 to the level A. At this level A, the individual method steps of layering and riveting, which are illustrated in FIG. 3 by stations II–V, take place.

In station II, the punched cam layers 30 are pressed out of the material strip 5 into the stack magazine 31 by means of the bundling ram 29, and the cam 9, which consists of a plurality of such cam layers 30, is formed in this way. FIG. 3 shows the station II in section and, above, the ready-layered cam 9 in its stack magazine 31.

After a predetermined number of cam layers 30 forms the cam 9, the timed feed unit 1 pushes the stack conveying magazine 32 further to the next station III in the direction of the arrow, while another stack magazine 31 comes into the station II, in order to form the next cam 9.

In station III, a rivet 33 A, B is supplied, while the individual cam layers 30, of which the cam 9 consists, are subsequently centered in station IV by means of a centering bolt 34 exactly filling the inner shape, in order thereby to acquire an exact cam shape. When this has been achieved, riveting is carried out.

In station V, the ready-stacked and riveted cam 9 is pressed out of the stack magazine 31 by means of a ram 35, deposited onto a transport band 36 and transported for final assembly.

The empty stack magazines 31 are then lined up, lowered onto the level B by means of the lowering unit 37, transported to the lifting unit 38 and raised to the level A again by means of a lifting unit 38. At this level, they are once again available for receiving cam layers 30 in front of the station II. Lowering to the level B takes place so that the stack magazines 31 can pass through under the feed 47.

The material strip 5, from which the individual cam layers 30 have been punched out, then runs through a feed 47 and is wound up by means of the waste winder 4 to form a waste coil.

Figure 6:
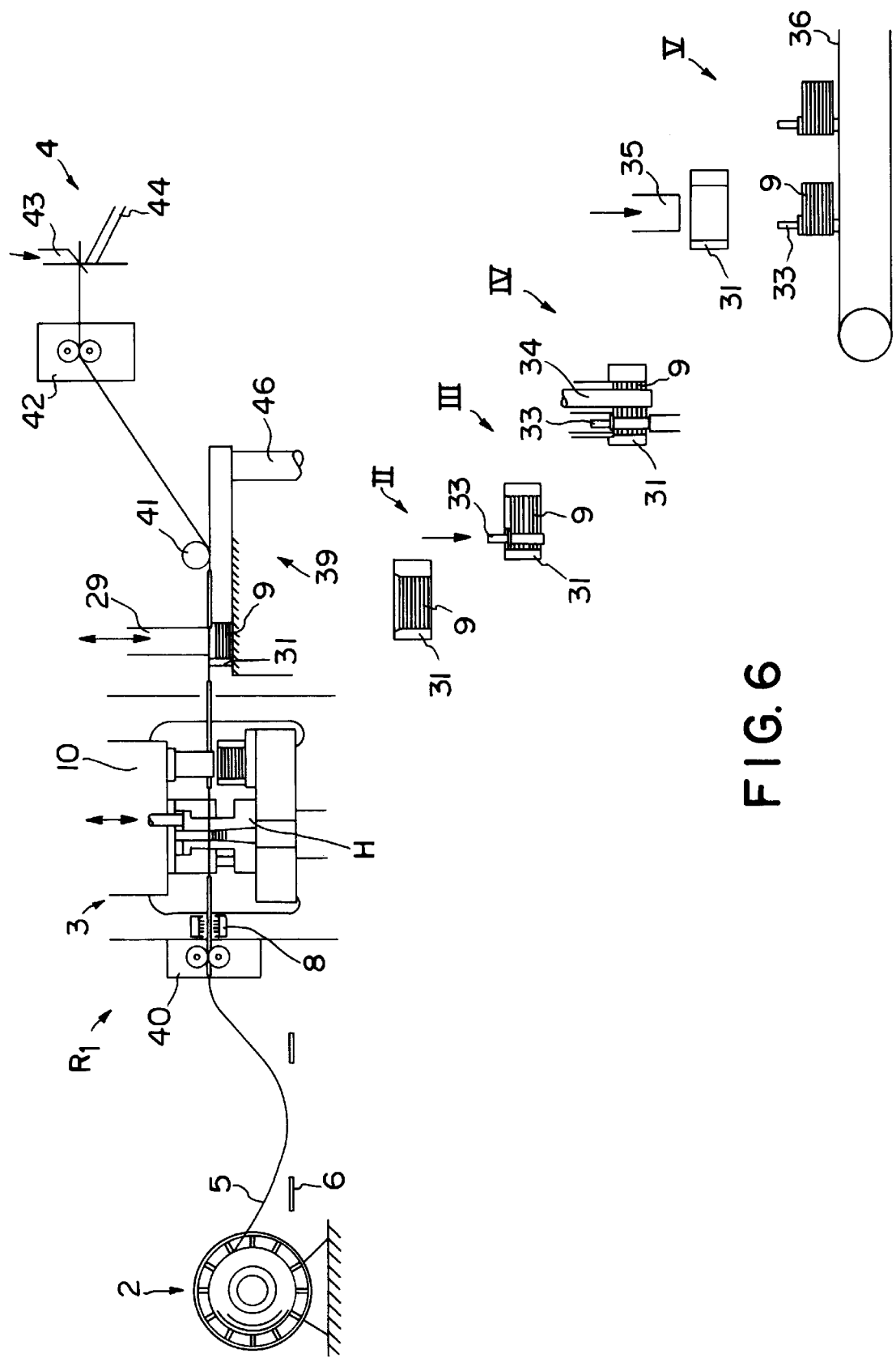
FIG. 6 shows a diagrammatic illustration of a further exemplary embodiment of an apparatus according to the invention for the production and layering of components.
Figure 7:
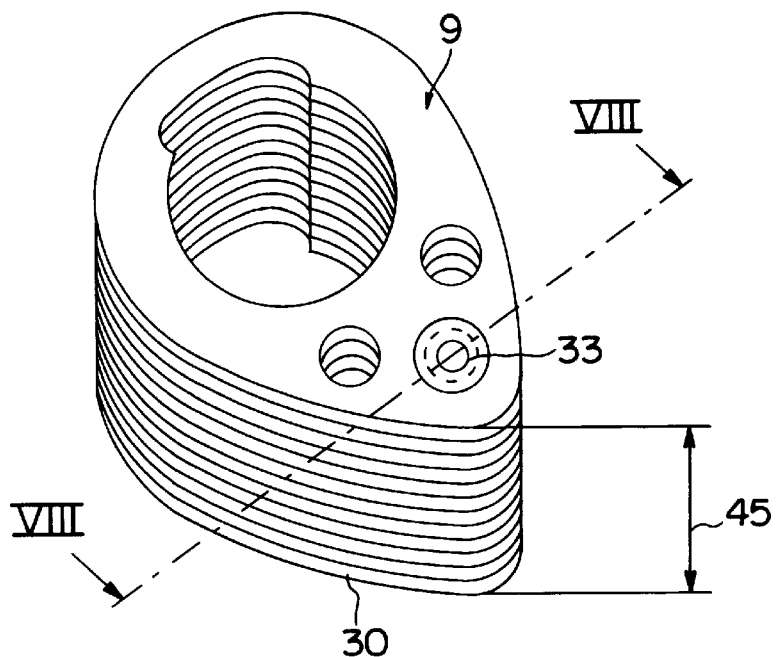
FIG. 7 shows a perspective view of a cam produced by the method according to the invention.

FIG. 6 illustrates diagrammatically a further exemplary embodiment of an apparatus $R_1$ for the production and layering of components. This apparatus $R_1$ likewise has a coil winder 2 and a punching press 3 which are followed, however, by a rotary indexing plate 39, an exit feed 42 and shears 43 which cut off a waste screen 44 from the punching screen.

In station II, on the rotary indexing plate which rotates about an axis, the punched cam layers 30 are pressed out of the material strip 5 into the stack magazine 31 by means of the bundling ram 20, and the cam 9, which consists of a plurality of these cam layers 30, is formed in this way.

Further machining is subsequently carried out in stations III–V, as described above, but on the rotary indexing plate 39.

The material strip 5, from which the individual cam layers 30 have been punched out, arrives, via a deflection 41, at the exit feed 42 and is cut off by means of the shears 43, so that a waste screen 44 falls into a collecting container not shown in any more detail.

FIGS. 7 to 10 in each case show completely layered and riveted cams 9 and 9.1 produced by the methods according to the invention. The number of cam layers 30 determines the cam thickness 45.

Figures 8A, 8B, 8C, 8D:
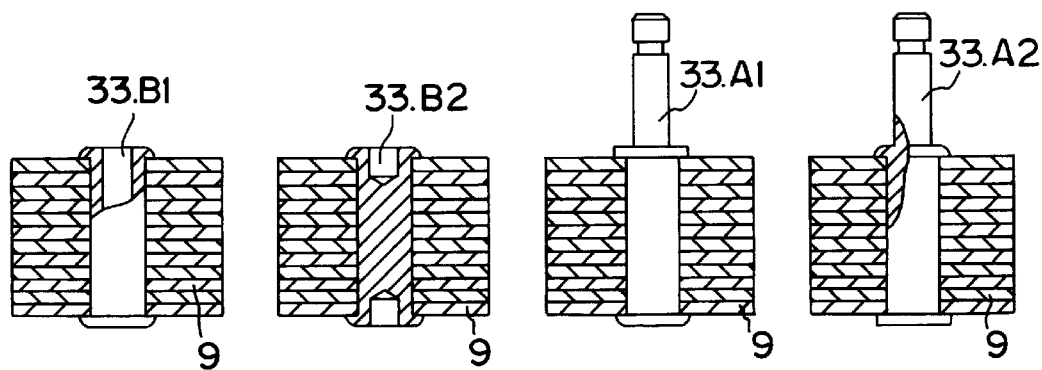
FIG. 8 shows cross sections through the cam along the line VIII—VIII in FIG. 7 with various rivets.
Figure 9:
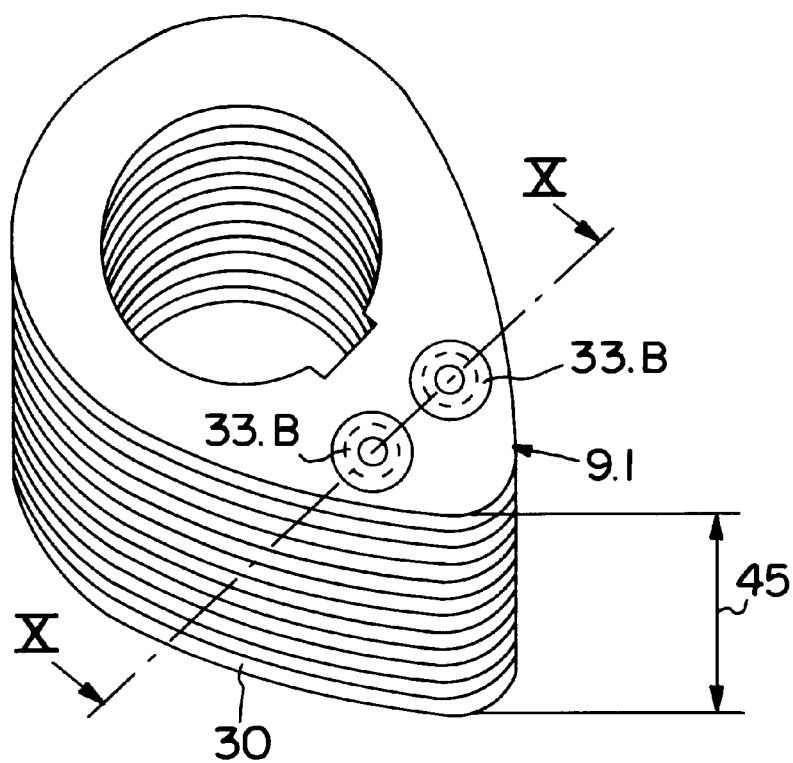
FIG. 9 shows a perspective view of a further exemplary embodiment of a cam produced by the method according to the invention.
Figure 10:
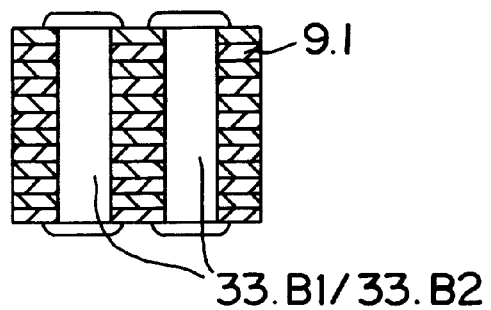
FIG. 10 shows a cross section through the cam according to FIG. 9 along the line X—X.

Various rivets for connecting the cam layers 30 are illustrated in cross section in FIG. 8. Thus, FIG. 8a shows a hollow rivet 33.B1 and FIG. 8b a solid rivet 33.B2. It is also possible for the rivet 33.A1 to be left hollow in the riveting region only, as shown in FIG. 8b. FIG. 8d also shows a fourth possibility for a rivet 33.A2 with a collar.

List of reference numerals

| | |
|---|---|
| 1 | Timed feed unit |
| 2 | Coil winder |
| 3 | Punching press |
| 4 | Waste winder |
| 5 | Material strip |
| 6 | Light barrier |
| 7 | Material entry |
| 8 | Lubricating appliance |
| 9 | Cam |
| 10 | Plunger |
| 11 | Chucking plate |
| 12 | Cutting plate |
| 13 | Ejector |
| 14 | Inner shape ram |
| 15 | Inner shape ram |
| 16 | Thrust bolt |
| 17 | Thrust bolt |
| 18 | Machine table |
| 19 | Chucking plate |
| 20 | Stripping plate |
| 21 | Thrust bolt |
| 22 | Thrust bolt |
| 23 | Cutting ram |
| 24 | Shafts |
| 25 | Shafts |
| 26 | Band guide |
| 27 | Inner shape waste |
| 28 | Inner shape waste |
| 29 | Bundling ram |
| 30 | Cam layer |
| 31 | Stack magazine |
| 32 | Stack conveying magazine |
| 33A, B | Rivet |
| 34 | Centering bolt |
| 35 | Ram |
| 36 | Transport band |
| 37 | Lowering unit |
| 38 | Lifting unit |
| 39 | Rotary indexing plate |
| 40 | Entry feed |
| 41 | Deflection |
| 42 | Exit feed |
| 43 | Shears |
| 44 | Waste screen |
| 45 | Cam width |
| 46 | Axis |
| 47 | Feed |
| 48 | |
| 49 | |
| 50 | |
| 51 | |
| 52 | |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | |
| 67 | |
| 68 | |
| 69 | |
| 70 | |
| 71 | |
| 72 | |
| 73 | |
| 74 | |
| 75 | |
| 76 | |
| 77 | |
| 78 | |
| 79 | |
| R | Apparatus |
| H | Die |
| O | Top part |
| U | Bottom part |
| A | Level |
| B | Level |

What is claimed is:

1. A method which comprises: producing components comprising layers by removing said layers from a hardened material strip of a thickness of 0.1–2 mm; pressing said removed layers back into said material strip after said removal; again pressing said layers out of the material strip in a following station; and inserting said layers into a stack magazine, in which said layers are centered and connected to form said components before discharge from the stack magazine.

2. A method according to claim 1, wherein said layers are removed from said hardened material strip by a method selected from the group consisting of punching out and cutting out.

3. A method according to claim 1, wherein said layers are connected to form cams.

4. A method according to claim 1, wherein the stack magazine is transported from a machining station to a further machining station in a timed feed unit.

5. A method according to claim 1, wherein the stack magazine is transported from a machining station to a further machining station on a rotary indexing plate.

6. A method according to claim 1, wherein the material strip is unwound from a coil winder and, after said layers have been removed, the material strip is wound up on a waste winder.

7. A method according to claim 1, wherein waste screens are cut off from the material strip after the layers have been removed from said material strip.

8. A method according to claim 1, wherein said layers are connected by means of rivets to form the components.

9. A method according to claim 8, wherein the riveting takes place both from below and from above.

\* \* \* \* \*